United States Patent [19]
Banks et al.

[11] Patent Number: 5,559,714
[45] Date of Patent: Sep. 24, 1996

[54] METHOD AND APPARATUS FOR DISPLAY SEQUENCING PERSONALIZED SOCIAL OCCASION PRODUCTS

[75] Inventors: Thomas B. Banks, Prairie Village, Kans.; Daniel B. Laughlin, Kansas City, Mo.

[73] Assignee: Hallmark Cards, Incorporated, Kansas City, Mo.

[21] Appl. No.: 60,094

[22] Filed: May 10, 1993

Related U.S. Application Data

[63] Continuation-in-part of Ser. No. 864,418, Apr. 6, 1992, which is a continuation-in-part of Ser. No. 602,439, Oct. 22, 1990.

[51] Int. Cl.⁶ .................................................. G06F 17/00
[52] U.S. Cl. ................................ 364/479.03; 364/478.01; 395/161
[58] Field of Search .................................... 364/468, 478, 364/479, 188–193, 400–412; 395/144–148, 155–161; 235/383, 385, 375

[56] References Cited

U.S. PATENT DOCUMENTS

| | | |
|---|---|---|
| Re. 32,115 | 4/1986 | Lockwood et al. . |
| Re. 33,316 | 8/1990 | Katsuta et al. . |

(List continued on next page.)

FOREIGN PATENT DOCUMENTS

| | | |
|---|---|---|
| 46025/89 | 6/1990 | Australia . |
| 1278862 | 1/1991 | Canada . |
| 0103759 | 3/1984 | European Pat. Off. . |
| 0010399 | 4/1989 | European Pat. Off. . |
| 0326515 | 8/1989 | European Pat. Off. . |
| 0453688 | 10/1991 | European Pat. Off. . |
| 2576437 | 7/1986 | France . |
| 2621153 | 9/1987 | France . |
| 2649232 | 1/1991 | France . |
| 59-33573 | 2/1984 | Japan . |
| 59-194263 | 11/1984 | Japan . |
| 2-27372 | 8/1988 | Japan . |
| 1005827 | 9/1965 | United Kingdom . |
| 2050106 | 12/1980 | United Kingdom . |
| 2065412 | 6/1981 | United Kingdom . |
| 2092354 | 8/1982 | United Kingdom . |
| 2105075 | 3/1983 | United Kingdom . |
| 2119600 | 11/1983 | United Kingdom . |
| 2150728 | 7/1985 | United Kingdom . |
| 2180427 | 3/1987 | United Kingdom . |
| 2242592 | 10/1987 | United Kingdom . |
| 2177245 | 10/1988 | United Kingdom . |
| 2208460 | 3/1989 | United Kingdom . |
| 2222341 | 2/1990 | United Kingdom . |
| 2228125 | 8/1990 | United Kingdom . |
| 2240897 | 8/1991 | United Kingdom . |
| 2246929 | 12/1992 | United Kingdom . |
| WO91/09385 | 8/1982 | WIPO . |
| WO83/00461 | 2/1983 | WIPO . |
| WO85/03152 | 7/1985 | WIPO . |

(List continued on next page.)

OTHER PUBLICATIONS

Albert, Alan E., "The effect of Graphic Input Devices on Performance in A Cursor Position Task," *Proceedings of the 26th Annual Meeting of the Human Factors Society*, pp. 54–57 (1982).

(List continued on next page.)

*Primary Examiner*—James Trammell
*Attorney, Agent, or Firm*—Leydig, Voit & Mayer, Ltd.

[57] ABSTRACT

A vending machine for displaying and dispensing personalized products includes apparatus for sequentially displaying personalized products of a given type in accordance with prior viewing and sales of each personalized product. The machine includes an enclosure with selection means on the outside thereof and with storage and handling means on the inside thereof, all coupled to computer equipment which is on the inside of the enclosure. The computer equipment is programmed to facilitate a customer's creation from among designs of products of a given type by ranking each of the designs and thereafter sequentially displaying the designs in accordance with its ranking.

2 Claims, 10 Drawing Sheets

U.S. PATENT DOCUMENTS

| | | |
|---|---|---|
| 3,454,956 | 7/1969 | Icenbice, Jr. et al. . |
| 3,609,250 | 9/1971 | Morris . |
| 3,688,276 | 8/1972 | Quinn . |
| 3,705,384 | 12/1972 | Wahlberg . |
| 3,800,932 | 4/1974 | Dana . |
| 3,828,904 | 8/1974 | Naitou et al. . |
| 3,864,708 | 2/1975 | Allen . |
| 3,892,427 | 7/1975 | Kraynak et al. . |
| 3,898,930 | 8/1975 | Ikegami et al. . |
| 3,932,036 | 1/1976 | Ueda et al. . |
| 3,943,335 | 3/1976 | Kinker et al. . |
| 3,949,375 | 4/1976 | Ciarlo . |
| 3,982,744 | 9/1976 | Kraynak et al. . |
| 3,990,710 | 11/1976 | Hughes . |
| 4,007,362 | 2/1977 | Sindermann . |
| 4,023,013 | 5/1977 | Kinker . |
| 4,034,839 | 7/1977 | Lee . |
| 4,041,467 | 8/1977 | Cota et al. . |
| 4,058,056 | 11/1977 | Rubin . |
| 4,070,698 | 1/1978 | Curtis et al. . |
| 4,085,445 | 4/1978 | Blevins et al. . |
| 4,096,933 | 6/1978 | Massa . |
| 4,144,656 | 3/1979 | Podkopaev et al. . |
| 4,160,271 | 7/1979 | Grayson et al. . |
| 4,173,024 | 10/1979 | Miller . |
| 4,190,819 | 2/1980 | Burgyan . |
| 4,193,114 | 3/1980 | Benini . |
| 4,239,380 | 12/1980 | Godshall . |
| 4,247,759 | 1/1981 | Yuris et al. . |
| 4,260,229 | 4/1981 | Bloomstein . |
| 4,261,012 | 4/1981 | Maloomian . |
| 4,275,449 | 1/1981 | Aish . |
| 4,297,724 | 10/1981 | Masuda et al. . |
| 4,300,040 | 11/1981 | Gould et al. . |
| 4,305,131 | 12/1981 | Best . |
| 4,308,017 | 12/1981 | Laughon et al. . |
| 4,310,885 | 1/1982 | Azcua et al. ............................ 364/405 |
| 4,319,336 | 3/1982 | Anderson et al. . |
| 4,339,134 | 7/1982 | Macheel . |
| 4,345,276 | 8/1982 | Colomb . |
| 4,354,613 | 10/1982 | Desai et al. . |
| 4,358,824 | 11/1982 | Glickman et al. . |
| 4,359,631 | 11/1982 | Lockwood et al. . |
| 4,369,082 | 1/1983 | Kerwin . |
| 4,396,307 | 8/1983 | Shah et al. . |
| 4,412,292 | 10/1983 | Sedam et al. . |
| 4,414,467 | 11/1983 | Gould et al. . |
| 4,417,322 | 11/1983 | Berry et al. . |
| 4,418,390 | 11/1983 | Smith et al. . |
| 4,434,467 | 2/1984 | Scott . |
| 4,435,772 | 3/1984 | Suzuki et al. . |
| 4,436,776 | 3/1984 | Wojcik . |
| 4,441,160 | 4/1984 | Azcua et al. . |
| 4,449,186 | 5/1984 | Kelly et al. . |
| 4,458,802 | 7/1984 | Maciver et al. . |
| 4,459,676 | 7/1984 | Oguchi . |
| 4,460,957 | 7/1984 | Eggebrecht et al. . |
| 4,463,874 | 8/1984 | Friedman et al. . |
| 4,481,590 | 11/1984 | Otten . |
| 4,484,304 | 11/1984 | Anderson et al. . |
| 4,488,224 | 12/1984 | Ippolito . |
| 4,488,244 | 12/1984 | Freeman . |
| 4,489,389 | 12/1984 | Beckwith et al. . |
| 4,495,582 | 1/1985 | Dessert et al. . |
| 4,498,139 | 2/1985 | Malinovsky . |
| 4,517,578 | 5/1985 | Tazaki . |
| 4,519,037 | 5/1985 | Brodeur et al. . |
| 4,520,451 | 5/1985 | McLaughlin . |
| 4,528,643 | 7/1985 | Freeny, Jr. . |
| 4,530,009 | 7/1985 | Mizokawa . |
| 4,542,378 | 9/1985 | Suganuma et al. . |
| 4,546,434 | 10/1985 | Gioello . |
| 4,553,222 | 11/1985 | Kurland et al. . |
| 4,559,598 | 12/1985 | Goldwasser et al. . |
| 4,567,359 | 1/1986 | Lockwood . |
| 4,575,813 | 3/1986 | Bartlett et al. . |
| 4,577,206 | 3/1986 | Hibino . |
| 4,591,983 | 5/1986 | Bennett et al. . |
| 4,596,924 | 6/1986 | Watanabe . |
| 4,598,376 | 7/1986 | Burton et al. . |
| 4,598,378 | 7/1986 | Giacomo . |
| 4,599,598 | 7/1986 | Komoda et al . |
| 4,602,286 | 7/1986 | Kellar et al. . |
| 4,603,966 | 8/1986 | Brownstein . |
| 4,608,662 | 8/1986 | Watanabe et al. . |
| 4,610,200 | 9/1986 | Metso . |
| 4,616,327 | 10/1986 | Rosewarne et al. . |
| 4,616,926 | 10/1986 | DiPietro et al. . |
| 4,621,443 | 11/1986 | Weinreich . |
| 4,623,292 | 11/1986 | Suzuki et al. . |
| 4,625,275 | 11/1986 | Smith . |
| 4,627,015 | 12/1986 | Stephens . |
| 4,640,529 | 2/1987 | Katz . |
| 4,641,197 | 2/1987 | Miyagi . |
| 4,646,250 | 2/1987 | Childress . |
| 4,650,977 | 3/1987 | Couch . |
| 4,652,998 | 3/1987 | Koza et al. . |
| 4,654,799 | 3/1987 | Ogaki et al. . |
| 4,655,026 | 4/1987 | Wigoda . |
| 4,672,554 | 6/1987 | Ogaki . |
| 4,672,683 | 6/1987 | Matsueda . |
| 4,674,041 | 6/1987 | Lemon et al. . |
| 4,674,055 | 6/1987 | Ogaki et al. . |
| 4,677,565 | 6/1987 | Ogaki et al. . |
| 4,677,570 | 6/1987 | Taki . |
| 4,683,536 | 7/1987 | Yamamoto . |
| 4,699,532 | 10/1987 | Smith . |
| 4,700,317 | 10/1987 | Watanabe et al. . |
| 4,700,318 | 10/1987 | Ockman . |
| 4,703,465 | 10/1987 | Parker . |
| 4,710,885 | 12/1987 | Litteken . |
| 4,711,543 | 12/1982 | Blair et al. . |
| 4,712,174 | 12/1987 | Minkler II . |
| 4,712,909 | 12/1987 | Oshikoshi . |
| 4,714,957 | 12/1987 | Takano . |
| 4,719,885 | 1/1988 | Nagano et al. . |
| 4,722,053 | 1/1988 | Dubno . |
| 4,723,212 | 2/1988 | Mindrum et al. . |
| 4,724,468 | 2/1988 | Bulls . |
| 4,727,589 | 2/1988 | Hirose et al. . |
| 4,731,743 | 3/1988 | Blancato . |
| 4,733,362 | 3/1988 | Haraguchi . |
| 4,736,306 | 4/1988 | Christensen et al. . |
| 4,740,904 | 4/1988 | Nagle . |
| 4,750,131 | 6/1988 | Martinez . |
| 4,750,151 | 6/1988 | Bans . |
| 4,760,245 | 7/1988 | Fukaya . |
| 4,764,867 | 8/1988 | Hess . |
| 4,764,880 | 8/1988 | Pearl . |
| 4,766,548 | 8/1988 | Cedrone et al. . |
| 4,766,581 | 8/1988 | Korn et al. . |
| 4,767,917 | 8/1988 | Ushikubo . |
| 4,769,694 | 9/1988 | Oshikoshi . |
| 4,771,401 | 9/1988 | Kaufman et al. . |
| 4,775,935 | 10/1988 | Yourick . |
| 4,779,080 | 10/1988 | Coughlin et al. . |
| 4,787,050 | 11/1988 | Suzuki . |
| 4,789,147 | 12/1988 | Berger et al. . |
| 4,789,907 | 12/1988 | Fischetti et al. . |
| 4,801,375 | 1/1989 | Padilla . |
| 4,811,240 | 3/1989 | Ballou et al. . |
| 4,814,592 | 3/1989 | Bradt et al. . |

| | | |
|---|---|---|
| 4,817,005 | 3/1989 | Kubota et al. . |
| 4,817,043 | 3/1989 | Brown . |
| 4,818,854 | 4/1989 | Davies et al. . |
| 4,833,307 | 5/1989 | Gonzalez-Justiz . |
| 4,835,683 | 5/1989 | Phillips et al. . |
| 4,839,505 | 6/1989 | Bradt et al. . |
| 4,839,829 | 6/1989 | Freedman . |
| 4,845,635 | 7/1989 | Rosselli . |
| 4,847,473 | 7/1989 | Lee et al. . |
| 4,847,761 | 7/1989 | Ferriter . |
| 4,847,764 | 7/1989 | Halvorson . |
| 4,852,013 | 7/1989 | Durst, Jr. et al. . |
| 4,862,376 | 8/1989 | Ferriter et al. . |
| 4,866,661 | 9/1989 | de Prins . |
| 4,873,643 | 10/1989 | Powell et al. . |
| 4,882,675 | 11/1989 | Nichtberger et al. . |
| 4,884,199 | 11/1989 | Boothroyd et al. . |
| 4,884,212 | 11/1989 | Stutsman . |
| 4,891,660 | 1/1990 | Biondo, Jr. . |
| 4,896,208 | 1/1990 | Moriya et al. . |
| 4,896,791 | 1/1990 | Smith . |
| 4,903,815 | 2/1990 | Hirschfeld et al. . |
| 4,916,637 | 4/1990 | Allen et al. . |
| 4,918,604 | 4/1990 | Baum . |
| 4,937,439 | 6/1990 | Wanninger et al. . |
| 4,949,257 | 8/1990 | Orbach . |
| 4,951,203 | 8/1990 | Halamka . |
| 4,954,956 | 9/1990 | Yamakawa et al. . |
| 4,962,475 | 10/1990 | Hernandez et al. . |
| 4,970,655 | 11/1990 | Winn et al. . |
| 4,982,337 | 1/1991 | Burr et al. . |
| 4,982,343 | 1/1991 | Hourvitz et al. . |
| 4,982,346 | 1/1991 | Girouard et al. . |
| 4,982,349 | 1/1991 | Cahall, Jr. et al. . |
| 4,991,108 | 2/1991 | Hamilton . |
| 4,992,940 | 2/1991 | Dworkin . |
| 4,993,587 | 2/1991 | Abe . |
| 4,999,065 | 3/1991 | Wilfert . |
| 5,007,084 | 4/1991 | Materna et al. . |
| 5,016,183 | 5/1991 | Shyong . |
| 5,017,953 | 5/1991 | Biondo, Jr. . |
| 5,018,085 | 5/1991 | Smith, Jr. . |
| 5,020,958 | 6/1991 | Tuttobene . |
| 5,025,397 | 6/1991 | Suzuki . |
| 5,025,399 | 6/1991 | Wendt et al. . |
| 5,029,099 | 7/1991 | Goodman . |
| 5,034,806 | 7/1991 | Ikeda et al. . |
| 5,036,472 | 7/1991 | Buckley et al. . |
| 5,038,293 | 8/1991 | Goodman . |
| 5,040,132 | 8/1991 | Schuricht et al. . |
| 5,042,078 | 8/1988 | Oshikoshi et al. . |
| 5,047,613 | 9/1991 | Swegen et al. . |
| 5,053,956 | 10/1991 | Donald et al. . |
| 5,056,029 | 10/1991 | Cannon . |
| 5,061,098 | 10/1991 | Engelhardt et al. . |
| 5,062,147 | 10/1991 | Pickett et al. . |
| 5,072,253 | 12/1991 | Patton . |
| 5,088,052 | 2/1992 | Spielman et al. . |
| 5,088,056 | 2/1992 | Isobe et al. . |
| 5,113,351 | 5/1992 | Bostic . |
| 5,117,283 | 5/1992 | Kroos et al. . |
| 5,119,475 | 6/1992 | Smith et al. . |
| 5,128,861 | 7/1992 | Kagami et al. ............... 364/402 |
| 5,146,548 | 9/1992 | Bijnagte . |
| 5,153,825 | 10/1992 | Yauk et al. . |
| 5,172,245 | 12/1992 | Kita et al. . |
| 5,187,797 | 2/1993 | Nielsen et al. . |
| 5,235,519 | 8/1993 | Miura . |
| 5,237,496 | 8/1993 | Kagami et al. ............... 364/401 |
| 5,283,865 | 2/1994 | Johnson ........................ 364/401 |
| 5,377,095 | 12/1994 | Maeda et al. ................. 364/401 |
| 5,383,111 | 1/1995 | Homma et al. ................ 364/401 |

FOREIGN PATENT DOCUMENTS

| | | |
|---|---|---|
| WO86/04703 | 8/1985 | WIPO . |
| WO90/07166 | 6/1990 | WIPO . |
| WO91/06913 | 5/1991 | WIPO . |
| WO92/02909 | 2/1992 | WIPO . |
| WO92/05660 | 4/1992 | WIPO . |
| WO92/17851 | 10/1992 | WIPO . |

OTHER PUBLICATIONS

"A 'Full House' Is Dealt to the Card Party", PPR/Apr., 1986, pp. 42–43.

"Birthday Times" brochures published by Hallmark Cards, Incorporated, 1986–1988.

"The Computer Poet", The Computer Poet Corporation, Copyright Oct. 1984 (Sales brochure).

Hall, M., "Let's Make Calendars & Stationery", Printware® 1886(c) Kyocera Unison, Inc.

Printmaster Menu, (From Patent Office Examiner's Personal File); date unknown.

Adler, M., "Create Your Own Greeting Cards", *Microcomputer Software*, p. 655 (Jan. 1985).

Solomon, G., "Got Something to Announce, Promote, Sell?", *Family Computing*, 43–45 (Jun. 1987).

Shea, T., "Cards Offer High Tech Greetings", *InfoWorld*, p. 1 (Apr. 1983).

Kerlow, I. V., "The Computer as an Artistic Tool", *Byte*, pp. 189–206 (Sep. 1984).

Cooper, D. "Computer Landscapes", *Bytes*, pp. 211–218 (Sep. 1984).

Heiser, P. W., "A Weaving Simulator", *Byte*, pp. 512–519 (Sep. 1982).

"Print Custome Designs on T–Shirts . . . In Color With Your Computer and Printer", "Underware" 1986 catalog listing.

"What's New: Tab–feed Greeting Cards", *Byte*, p. 574 (Dec. 1983).

"Comp–U–Store System Could Change Retail Economics", *Direct Marketing Magazine*, pp. 101–107 (Jul. 1983).

Gatty, B., "Setting Up Shop On Computer Screens", *Nation's Business Magazine*, pp. 57–58 (Mar. 1984).

"Touchcom® Interactive Videodisc Catalog Markets Furniture at Dayton's", *Videodisc and Optical Disk*, pp. 343–345 (Sep.–Oct. 1985).

"Retailers Beginning to Tune In Video Displays", *Advertising Age*, pp. 66–67 (Nov. 1985).

"These Instant–Win Games Talk Back", *AdWeek's Promote*, p. 4 date unknown.

Corliss, P. W. Jr., "Cardmarketing . . . Your Way to a Powerful Database", Excerpt of Presentation to the Direct Marketing Association, 71st Annual Conference, (undated).

"The Sports Vacation Network", Sales Brochure, The Sports Vacation Network®, Research and Development by Intermark (undated).

"Vision 1000 The Total Promotion Delivery Vehicle", Advanced Promotion Techonologies brochure (undated).

"Which Way To Go With Interactive Video", Interac Corporation brochure, copyright 1987.

"Interactive Video Merchandising", ByVideo Inc. sales brochure, May 1988.

"The Right Medium, the Right Moment", Advanced Interactive Video sales brochure (undated).

"Exhibit Source, Inc. Company Background" sales brochure, Exhibit Source, Inc. (undated).

McNally, M., "Food Chain Employees Scanning Technology In Instant Win/Prize Drawing Promotion", *Incentives In Action*, pp. 22–23 (1989).

Murray, C., "Roboclerk in tune with service industry", *Chicago Tribune*, p. 1, (May 28, 1990).

"High Tech Bard of Greeting Cards", *Nation's Business*, Feb. 1985.

Card Shop brochure, Artsci, 1986, 1 page.

The Social Secretary brochure, 5 pages, date unknown.

"The Card/O/Mat®" brochure by MQP, 6 pages (date unknown).

"7–Eleven to Sell Do–It–Yourself Tickets", *Insight*, p. 42 (Jan. 1986).

"In–Store Computer Designs Home Projects", *Design News*, p. 38 (Oct. 23, 1989).

Murray, C. J., "Now There's a Robot Salesclerk", *Design News*, pp. 78–81 (Mar. 26, 1990).

Tyler, M., "Touch Screens: Big Deal or No Deal?", *Datamation*, pp. 146–154 (Jan. 1984).

English, W. K., et al., "Display—Selection Techniques for Text Manipulation", *IEEE Transactions on Human Factors In Electronics*, pp. 5–15 (Mar. 1967).

Schneiderman, B., "Designing the User Interface," Reading MA: Addison–Wesley Publishing Co., Inc. pp. 271–282 (1987).

Hohman, E. J., "How Computerized Cards Make This Shop 'Truly a Treat' ", *Greetings Magazine*, 55(3), pp. 12–24, (Jan. 1987).

Date, C. J., "An Introduction to Database Systems", vol. I, Third Edition, Readings, MA: Addison–Wesley Publishing Co., Inc., pp. 120–121 (1981).

Balsam, D., et al., The Print Shop Reference Manual for the Macintosh, Copyright 1986, 1989 Broderbund Software, Inc., pp. 1–51.

McAndrews, S., "Magical Poet Literature", pp. 1–20 (undated).

Marsh, R. "Automatic Text Generation", Br Telecom Technol J., 6(4), pp. 84–88 (Oct. 1988).

Nieuenbuysen, P. "Criteria For the Evaluation of Text Storage and Retrieval Software", The Electronic Library, 6(3), pp. 160–166 9 Jun. 1988).

Tanaka, M. et al. "A Visual User Interface for Map Information Retrieval Based On Semantic Significance", IEEE Transaction on Software Engineering, 14(5), pp. 666–670 (May 5, 1988).

Eastman Kodak, "Photo Enlargements Via Vending Machine; Kodak Create–A–Print 35 mm Enlargement Center", 60(9), p. 12, 1988—Lexis Report, pp. 3–4.

Smith, M. W. et al., "The Interactive Display Design Tool: An Application Program for Human Factors Part–Task Simulation Development", IEEE, pp. 856–859 (1988).

Craven, T. C., "Adapting of String Indexing Systems for Retrieval Using Proximity Operators", Information Processing & Management, 24(2), pp. 133–140 (1988).

Meadow, C. T., "Oakdec, a Program for Studying the Effects On Users of a Procedural Expert System for Database Searching", Information Processing & Management, 24(4), pp. 449–457 (1988).

Cameron, K. L., et al., "Producing Geological Illustrations Using PC–Based Computer–Aided Drafting", Computers & Geosciences, 14(3), pp. 291–297 (1988).

Yamamoto, A., et al., "Image Retrieval System Based on Object Features", IEEE Montech, pp. 132–134 (1987).

"Products", 1 page date unknown.

Bovey, J. D. et al, "Interactive Document Display and its Use in Information Retrieval", Journal of Documentation, 43(2), pp. 125–137 (Jun. 1987).

Stefik, D. G. Bobrow, et al., "WYSIWIS Revised: Early Experiences with Multiusers Interfaces", ACM Transactions on Office Information Systems, 5(2), pp. 147–167 (1987).

Bihr, R. A., "Automated Storage and Retrieval of Works Standards", Computers Ind. Engng., 13(1–4) pp. 312–316 (1987).

Biswas, Gautam, et al., "Knowledge–Assisted Document Retrieval: I. The Natural–Language Interface", Journal of the American Society for Information Science, 38(2), pp. 83–96 (1987).

Biswas, Gautam et al., "Knowledge–Assisted Document Retrieval: II. The Natural–Language Interface", Journal of the American Society for Information Science, 38(2), pp. 97–110 (1987).

Jones, P. et al., "A Language for Simple Interactive From a Database System", Data & Knowledge Engineering 2, pp. 303–321 (1987).

Croft, W. B. et al., "I$^3$R: A New Approach to the Design of Document Retrieval Systems", Journal of the American Society for Information Science, 38(6), pp. 389–404 (1987).

Nicholas, J., et al., "Retrieval Techniques", Annual Review of Information Science and Technology, 22, pp. 109–145 (1987).

Frank, A., "Integrating Mechanisms for Storage and Retrieval of Land Data", Surveying and Mapping, 46(2), pp. 107–121 date unknown.

Restorick, F. M., "Novel Filing Systems Applicable to an Automated Office: A State–of–the–Art Study", Information Processing & Management, 22(151–172 (1986).

Crawford, R. G., et al., "A Novice User's Interface to Information Retrieval Systems", Information Processing & Management, 22(4) pp. 287–298, (1986).

Strong, G. W., et al., "A Thesaurus for End–User Indexing", Information Processing & Management, 22(6), pp. 487–492 (1986).

McDonald, N. N., "Video–graphic Query Facility for Database Retrieval", The Visual Computer, 2, pp. 72–77 (1986).

Crain News Service, "Retailers Beginning to Tune in Video Displays", Advertising Age, p. 66 (1985).

Cohill, A. M., et al., "Retrieval of HELP Information for Novice Users of Interactive Computer Systems", The Human Factors Society, Inc., 27(3), pp. 335–343 (1985).

Salton, G., e al., "Advanced Feedback Methods in Information Retrieval", Journal of the American Society for Information Science, 36(3), pp. 200–210 (1985).

Bansier, J. et al., "Filing and Retrieval of Unstructured Information: Some System Considerations", ESPRIT, pp. 296–313 (1985).

Takagi, T. et al., "A Frame–based Interface for Question–Answering Systems", IEEE, pp. 388–393 (1985).

Laender, A. H. F., et al., "An Interactive Database End User Facility for the Definition and Manipulation of Forms", pp. 41–54 date unknown.

Lyman, W., et al., "CAD Generation of Accident Diagrams for Local Agencies", pp. 657–664 date unknown.

Croft, W. B., et al., "The Use of Adaptive Mechanisms for Selection of Search Strategies in Document Retrieval Systems", Dept. of Computer and Information Science, University of Massachusetts, pp. 95–110 date unknown.

Yeazel, L. A., "Point–of–Purchase—The Decision to Buy", Pioneering Perspective, pp. 36–37 date unknown.

Creative Expressions, "Creative Expressions—Bringing Feelings to Life Through Technology" Brochure (date unknown).

North DeKalb News/Sun, "Computer Lends Personal Touch to Greetings", Feb. 19, 1986.

Article from PPR Magazine, p. 43, 1986.

Current Catalog© 1986.

Current Catalog© 1987.

METHOD AND APPARATUS FOR DISPLAY SEQUENCING PERSONALIZED SOCIAL OCCASION PRODUCTS

REFERENCE TO RELATED APPLICATIONS

This application is a continuation-in-part of application Ser. No. 07/864,418, filed Apr. 6, 1992, which is a continuation-in-part of application Ser. No. 07/602,439, filed Oct. 22, 1990. This application is also related to subject matter disclosed in U.S. Pat. No. 5,036,472, and Ser. No. 07/735,985, filed Jul. 25, 1991. This application is also related to application Ser. No. 514,670, filed Apr. 25, 1990. The disclosures of all of said applications are incorporated herein by reference.

FIELD OF THE INVENTION

This invention relates to the personalized social occasion kiosk art and more particularly to apparatus and methods for sequentially displaying personalized social occasion products including greeting card designs of a given type based on a dynamic ranking of the social occasion products. This ranking correlates, at least in part, to prior viewing and/or sales of the products.

BACKGROUND OF THE INVENTION

Heretofore, variable data has been utilized in the production of personalized "ME" books in which, for example, the name of a child who is to receive a story book is printed in the text of the story book. These arrangements utilize a computer to control a printer to print variable data on preprinted sheet material to form sheets which are thereafter bound together to provide the final hard cover book product. Many types of variable data may be stored in the computer and such variable data may include quality control indicia such as check bars or other graphics.

Rosewarne et al.'s U.S. Pat. No. 4,616,327 discloses methods similar to those disclosed in the "ME" book patents and the printing of specific types of graphics including pictorial figures having physical characteristics similar to personalized data introduced into the system. A standard microprocessor is programmed to provide storage and combining functions after personalized data is introduced into the system by temporary storage by the purchaser or user on a storage medium such as a punched card. One or more plotters are used for producing the final product.

Buckley et al.'s U.S. Pat. No. 5,036,472 discloses a machine for vending greeting cards and similar social occasion personalized products. A customer operates the machine without assistance to obtain personalized or customized products of his or her choice. The machine includes means for displaying identifications of available products and desirable attributes and features thereof. The machine also includes modes of selection to facilitate selection of products and the desired attributes and features by the customer.

Inasmuch as each greeting card design or other personalized product is created with a unique set of personalized data, each customer transaction or experience requires significant customer interaction in order to select a desired card design of a given type, to input personalized data and to create a desired product. Performance of these tasks requires varying amounts of time depending, in large measure, on customer decision making abilities. It is desirable, therefore, to reduce the aggregate amount of time utilized for customer interaction. In this way, the machine achieves increased throughput, particularly in a commercial environment.

SUMMARY OF THE INVENTION

Thus, the prior art personalized product vending designs now offer less than optimal performance, particularly in a commercial setting. Accordingly, a principle object of the invention is to generally overcome the deficiencies of the prior art.

More particularly, it is an object of the present invention to provide improved efficiency in a machine for creating personalized products, such as greeting cards.

It is a more particular object of the present invention to find increased throughput of personalized products in a machine, while at the same time, to facilitate design selection by a customer.

It is yet a further object of the present invention to provide enhanced marketing capabilities of personalized products.

It is still another object of the present invention to customize a kiosk location in accordance with customer preferences at that location.

The present invention provides these and other additional objects in an improved machine for displaying a plurality of personalized products of a given type in a preselected sequence related to prior viewing and/or sales history of the products. The present invention further provides a method of using the same invention to achieve the desired result. The machine includes an enclosure with at least selection means on the outside thereof and with storage and handling means on the inside thereof, all coupled to computer equipment which is on the inside of the enclosure. The computer equipment facilitates a customer's creation of a personalized product from among types of products to be delivered and the desired mode of personalization thereof. Thereafter, a completed personalized product is delivered to a receptacle from which it may be removed by the customer.

Available products and their desirable attributes and features are identified both audibly and visually through presentation of a sequence of images and associated sound to present a series of descriptions of available products and their features with instructions as to initiating use of the machine. When a customer initiates use of the machine, he or she is then supplied with specific instructions to make it possible to make selections easily, quickly and accurately. The invention facilitates selection of a desired product by periodically tabulating the mix of available products of a given type which are viewed and also the number of products that are selected and personalized by customers. This data is accumulated in the system and used to generate customer displays utilized to initiate customer card selection. Preferably, the newest available designs are first displayed to a customer in an order of least viewed to most viewed. Thereafter, the most popular designs in a prior preset time period are displayed. Less successful selections are displayed in an order of descending popularity. Finally, less popular designs are displayed in an order of least viewed to most viewed. Accordingly, the sales of the most attractive products are quickly selected more often than other less attractive products. Likewise, the newer designs and weaker card designs are rotated so that each design has a fair opportunity for selection. Thereafter, such data is updated to provide a dynamic ranking system.

The invention also provides a method for displaying personalized social occasion products of a given type in a computer controlled machine. The machine first assigns a value to each of a plurality of personalized social occasion products of a given type. This value is related to, at least in part, prior sales of the personalized products and the number of times viewed. Each the personalized products of a given type are thereafter ranked in accordance with its assigned value. In this way, the personalized products may be displayed according to their respective ranking. The ranking is periodically updated to provide increased efficiency and faster design selection.

BRIEF DESCRIPTION OF THE DRAWINGS

The above described and additional objects and features of the present invention may be further understood by reference to the following detailed description of the preferred embodiment taken in conjunction with the drawings of which.

DETAILED DESCRIPTION OF THE DRAWINGS

Generally, the present invention provides an improved machine that dynamically assigns a ranking to each of a plurality of personalized product designs of a given type, such as greeting cards, in a commercial setting. The personalized products are then displayed in accordance with their ranking. In this way, the invention facilitates design selection while providing increased throughput of personalized product designs. Accordingly, the invention permits a more efficient customer experience in creating a personalized product. In addition, the invention provides for an internal customization at each machine location in order to meet customer demands.

Figure 1:
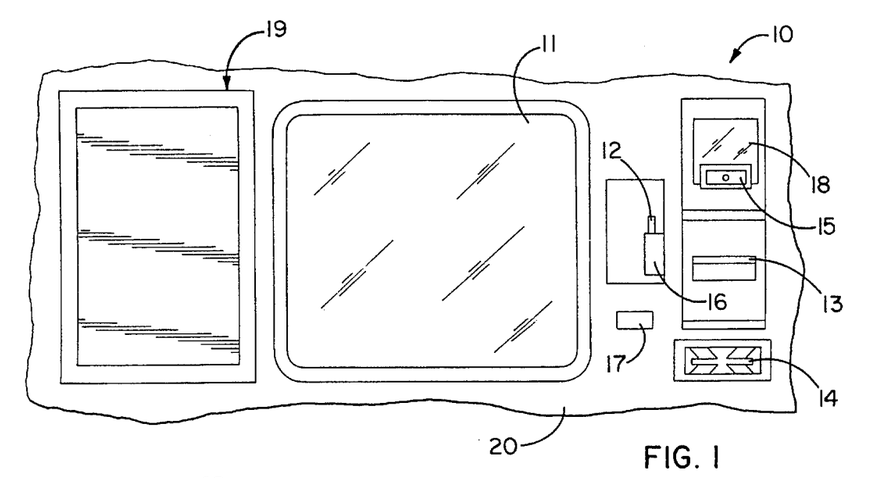
FIG. 1 shows a front panel portion of a vending machine constructed in accordance with the invention.

Referring now to the drawings, FIG. 1 illustrates a kiosk or machine 10 particularly designed for vending personalized greeting cards. The machine 10 includes display means including a screen 11 that is operable to present visual illustrations in color to enable a customer to select from among a large number of available greeting cards or other products and to enable the customer to select text and other modifications as may be desired for personalization of the selected card or product. The display means preferably includes voice generating means for providing an audible presentation correlated to the visual presentation.

In an introductory presentation mode, such display means present a sequence of identifications of the available products and desirable attributes and features thereof to persons in the vicinity of the machine 10. The machine 10 also provides operating instructions in the introductory presentation mode.

The machine 10 may be used to supply products of a given type including get-well, birthday, wedding, anniversary, and seasonal products such as Easter, Passover, Hanukkah, Christmas cards. Other types of greeting cards may also be utilized. In each case, a personalized message may be printed along with the name of the recipient of the card and the name of the sender of the card.

In the illustrated embodiment, the screen 11 is operable as a touch screen for selection of the product and attributes thereof and for entering of name, date and personalized message data where a personalized product is selected. The customer is invited to touch a portion of the screen to indicate an intention to consider purchase of a selected one of the available products and is then instructed audibly through voice generating means and visually through the screen 11 for conditional pre-payment for the product, payment being conditioned upon the customer's final approval of the product. When a customer fails to touch the screen 11 in the appropriate place, the introductory presentation mode is repeated.

The machine 10 is shown in FIG. 1 as a vending machine. Alternatively, the machine may be provided without any pre-payment equipment with appropriate modification as will be understood by those skilled in the art. In the illustrated embodiment, however, pre-payment is effected by insertion of coins in a coin slot 12, insertion of a bill in a bill receiving slot 13 or momentary insertion of a credit card in a credit card reader slot 14. Upon entry of selection and personalization data, as hereinafter described, the customer is invited to indicate final approval of a product by pressing a "buy" button 15. At this time, as well, the product selected for purchase is shown on the screen 11 for visual verification. The change cup 16 is provided for return of coins made as prepayment and delivering any change which may be due. A refund button 17 is also provided and a small read-out display 18 may either be associated with the payment receiving devices or preferably is displayed on the screen 11.

A delivery receptacle 19 is provided into which the selected product is delivered, along with envelope or other required associated materials. The delivery receptacle 19, the screen 11, coin slot 12, and payment effecting devices are positioned on a front panel 20 of a housing 22 as generally shown in FIGS. 4 and 5.

Figures 2, 3:
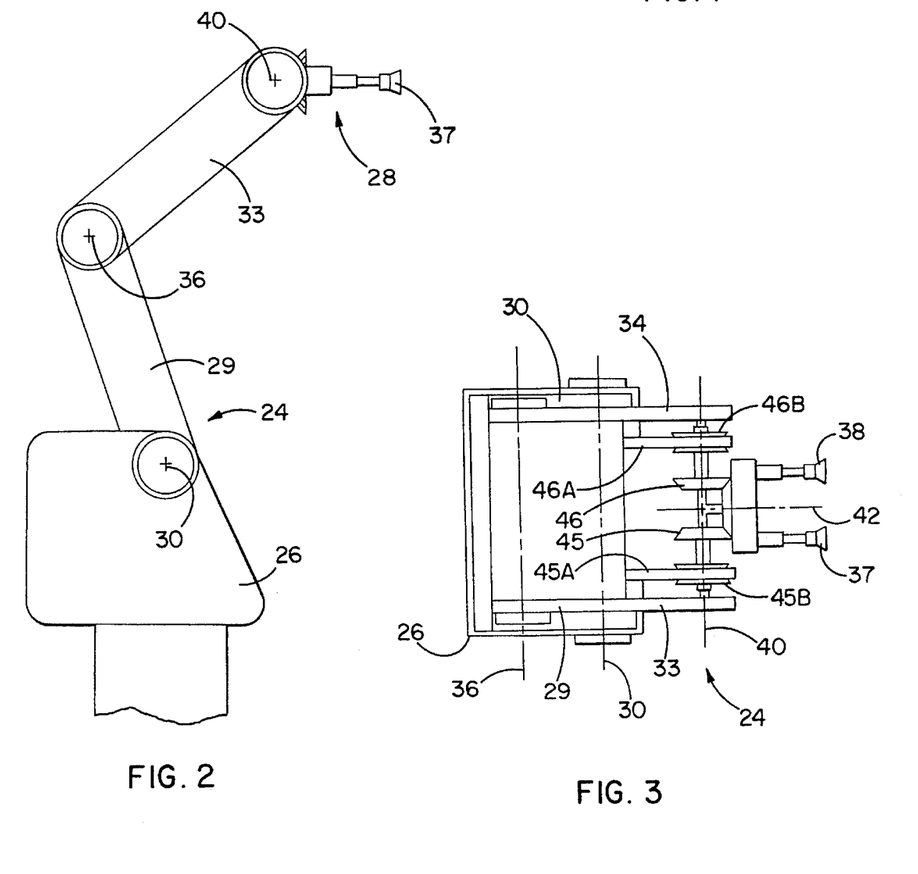
FIG. 2 is a side elevational view of a robot used in handling products within the machine of FIG. 1.
FIG. 3 is a top plan view of the robot of FIG. 2.

In one embodiment, a robot 24 within the housing 22 operates to effect transfers of base product, such as greeting card stock, as required to effect personalization of a product in accordance with data supplied by a customer. Depending upon the type and variety of base products to be used, a paper feed assembly rather than a robot may be used to effect transfers of base product as required to effect personalization of a product in accordance with data supplied by a customer. Those skilled in the art will recognize that various standard automation devices in addition to the use of a robot are within the scope of the invention.

Where a robot is utilized, a suitable robot 24 is a commercially available type of robot of a type sold by Eshed Robotic, Inc. of Princeton, N.J. and includes electro-mechanical components which are not shown in detail. Such components are responsive to applied electrical signals to accurately control rotation of the turret head 26 about a vertical axis, rotation of links 29 and 30 about the horizontal axis 32, rotation of the links 33 and 34 about the horizontal axis 36 and rotation of the transfer head 28 relative to the links 33 and 34 about the axes 40 and 42.

Figures 4, 5, 6:
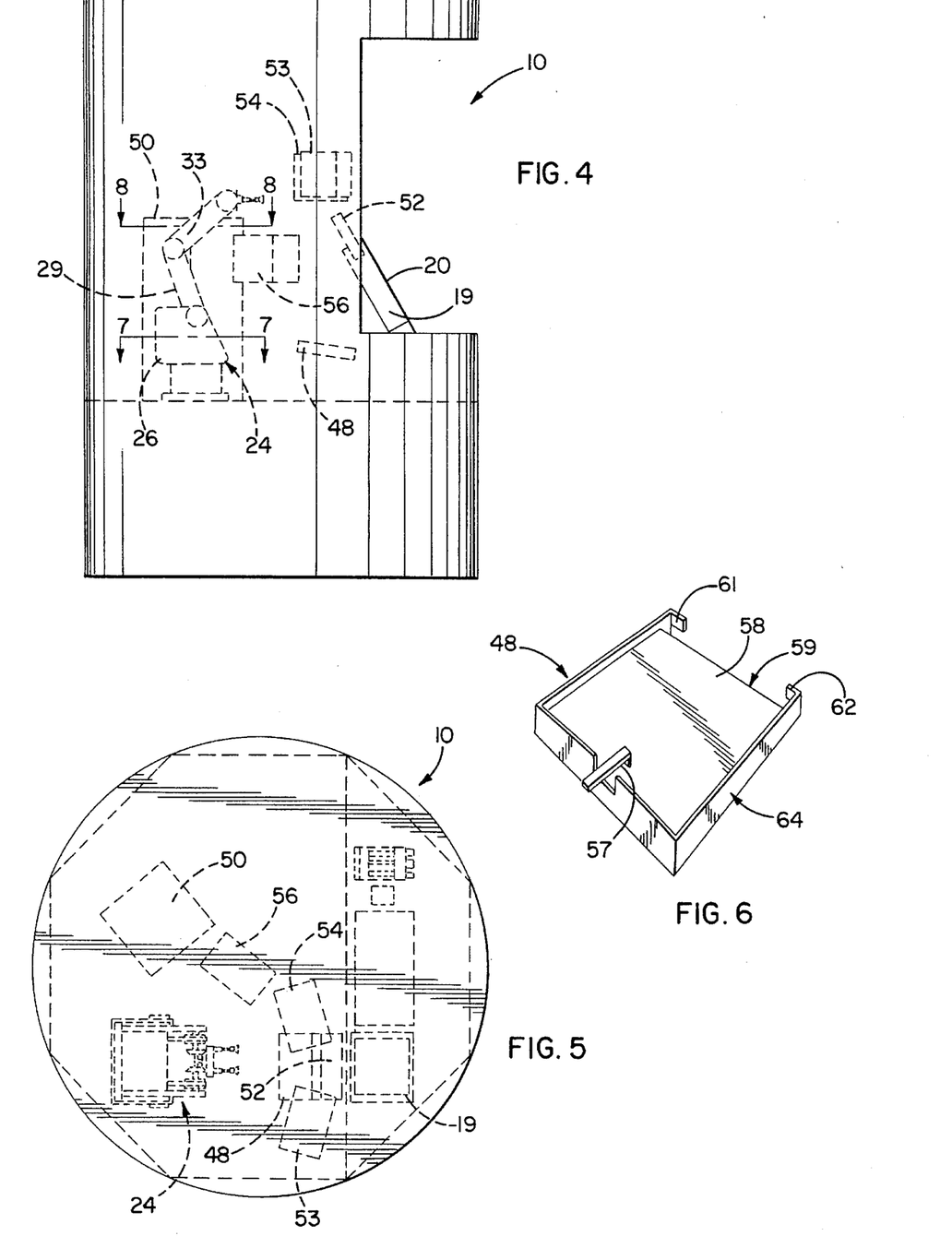
FIG. 4 is a side elevational view of the machine of FIG. 1, illustrating diagrammatically the positions of the robot of FIGS. 2 and 3 and other components within the machine.
FIG. 5 is a top plan view corresponding to FIG. 4.
FIG. 6 is a perspective view illustrating a blank card supply and feeder section of the machine of FIG. 1.

The position of the robot 24 and the positions of other components within the housing 22 are indicated diagrammatically in dotted lines in FIGS. 4 and 5. In brief, the transfer head 28 of the robot 24 of the illustrated machine 10 is operated to pick up a sheet of greeting card stock from a blank card supply and feeder unit 48 and thereafter inserts the sheet into a feeder slot at the lower end of the printer 50, picks up the sheet after printing on one side thereof, reinserts the sheet into the printer 50 for printing on the opposite side thereof, transfers the sheet to a decurling assembly associated with the printer 50, picks up the decurled sheet from the decurling assembly, and thereafter transfers the sheet to a delivery station 52.

While printing operations are taking place, the transfer head 28 is operated to transfer an envelope and a bag from envelope and bag supply stations 53 and 54 to the delivery station 52. The printed sheet, envelope and bag are then dropped downwardly from the delivery station 52 to the delivery receptacle 19 to be picked up by the customer.

Figure 7:
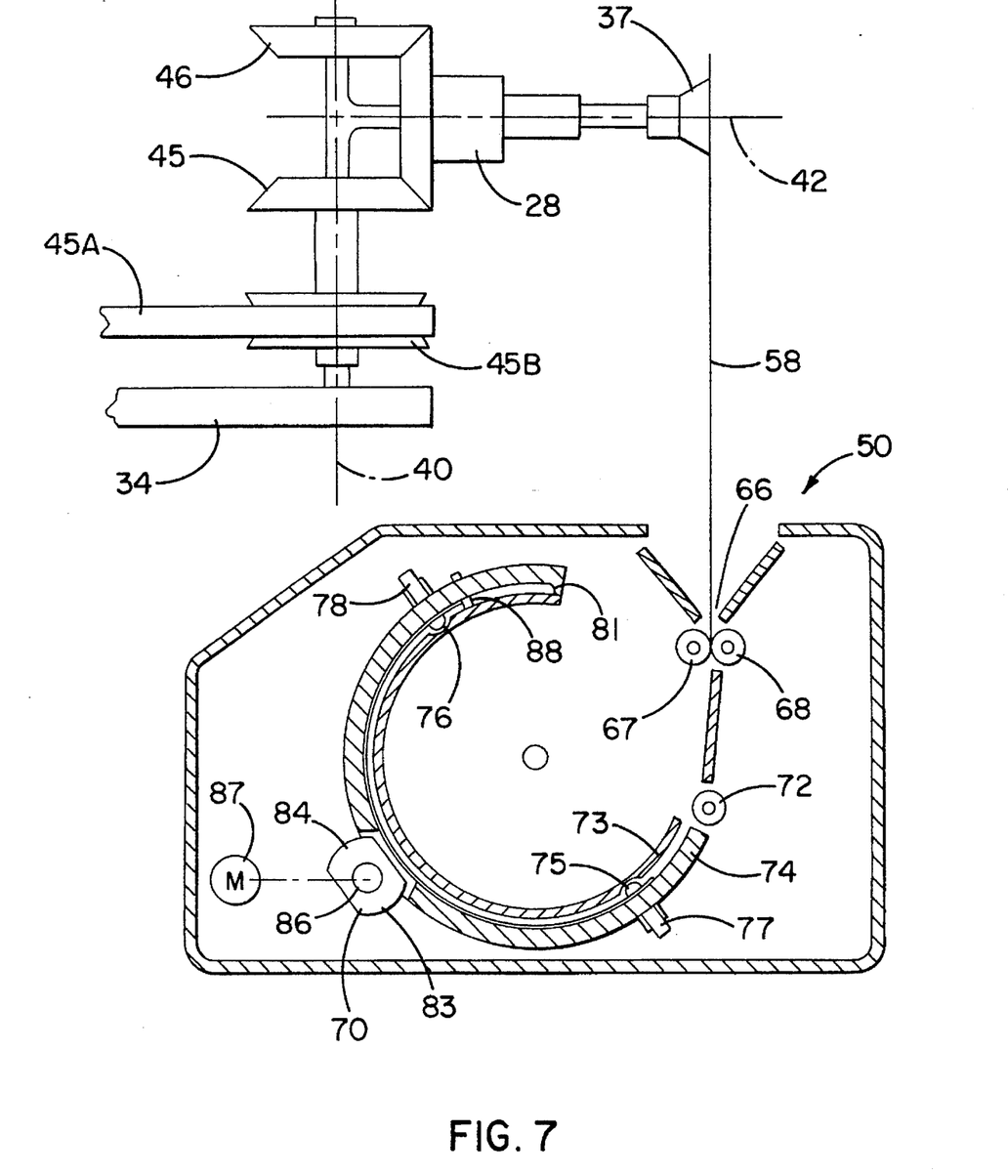
FIG. 7 is a cross-sectional view of a lower portion of a printer of the machine of FIG. 1, looking downwardly at a level as indicated by line 7—7 of FIG. 4, also showing the feed of a sheet to the printer by the robot.

FIG. 7 is a cross-sectional view of a lower portion of the printer 50, looking downwardly at a level as indicated by line 7—7 of FIG. 4, also showing the feed of sheet 58 to the printer by the robot 24. The illustrated printer 50 includes portions of a known type of ink jet color printer manufactured by Howtek, Inc. of Hudson, N.H. and disclosed in U.S. Pat. Nos. 4,591,281 and 4,714,936, the disclosures of which are incorporated by reference. Other types of printers may also be used as will be understood by those skilled in the art.

Figure 8:
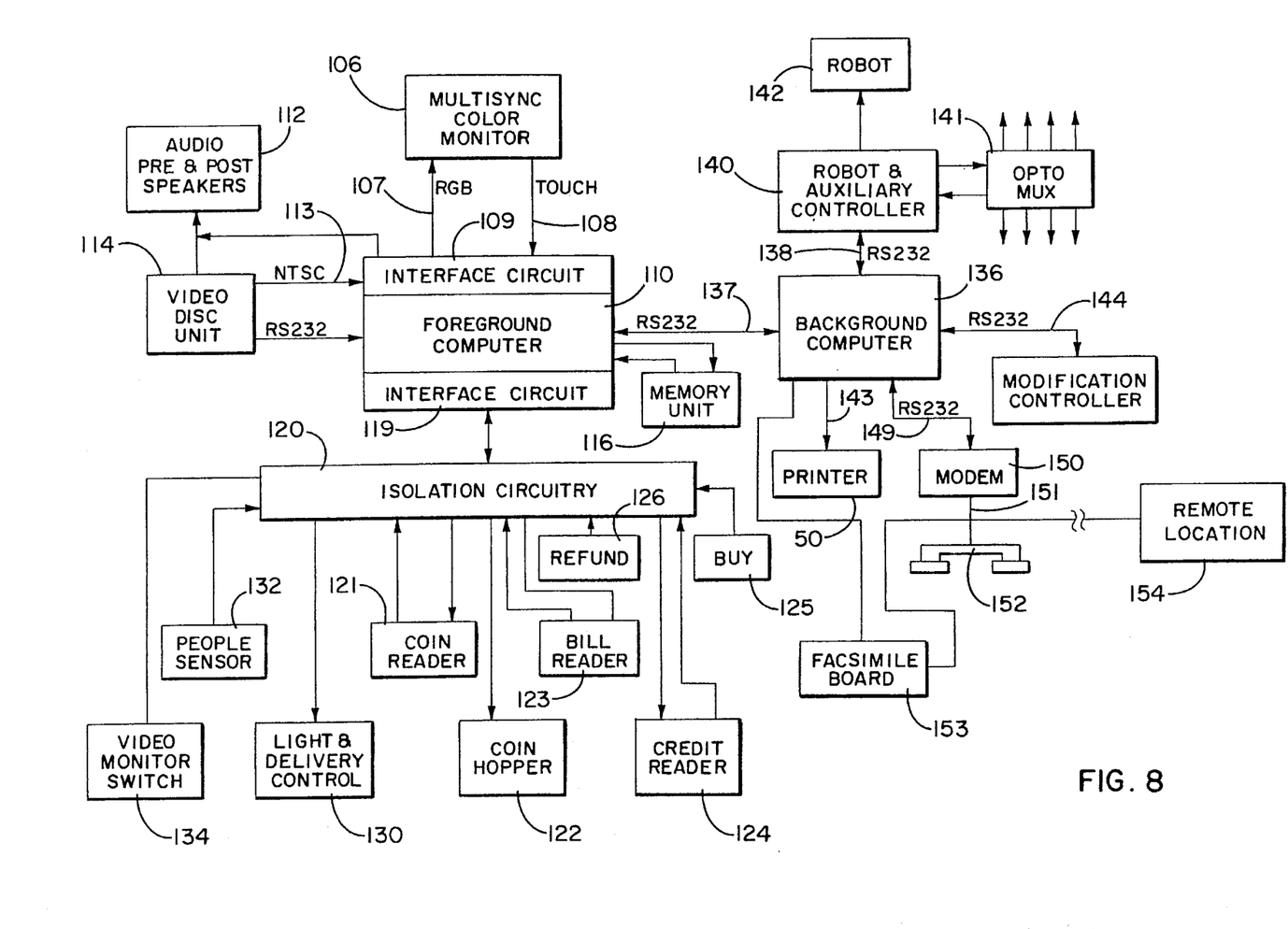
FIG. 8 is an electrical block diagram illustrating computer equipment and other circuitry of the machine.

FIG. 8 is an electrical block diagram of the control system for visual and audio presentations and control of making of a personalized product as selected by the customer. The presentation screen 11 of FIG. 1 is provided by a monitor 106 which is connected through a video drive cable 107 and a touch signal transmission cable 108 to an interface circuit 109 of a "foreground" computer 110, operative to control presentation and control operations directly associated with the customer. A separate "background" computer 136 controls operation of the base product manipulation and feeding means, such as the robot 24, and the printer 50. Those skilled in the art will understand that the terms background computer and foreground computer may be used to refer to two separate computer systems or to other computer equipment capable of parallel processing.

Interface circuit 109 also operates to transmit an audio signal through a cable 111 to a speaker unit 112 and to receive a NTSC signal through a cable 113 from an optical disc unit 114, or other suitable storage media such as CD-ROM, writable compact disc or hard disk. The NTSC signal is then manipulated by the interface circuit 109 and transmitted via cable 107 to the monitor 106. The interface circuit 109 is such that the optical disc unit 114 is controllable from the computer 110 through a RS232 serial link 115 to supply signals to develop displays of a very large number of color graphics stored on an optical disc, or other suitable storage device such as CD-ROM, writable compact disc or hard disc, and from which the customer may select one suitable for personalization of a card. A direct connection 115 is provided between optical disc unit 114 and the speaker unit 112 for developing an audio signal corresponding to the display developed by monitor 106 from the transmitted video signal.

For printing of color graphics corresponding to the graphics produced from the video disc or other storage device, data for producing corresponding CMYK signals are stored in a memory unit 116, such as a hard disc drive unit. It will be understood that the invention is not limited to any particular form of media, either optical or magnetic or otherwise, for storing of graphics and other data.

For transmitting and receiving control signals to and from the control panel, an interface circuit 119 of the computer 110 is connected through isolation circuitry 120 to a coin reader 121 which provides the coin slot 12, to a circuit 122 which controls delivery of coins to the change cup 16, to a bill reader 123 which provides the bill receiving slot 13, to a credit card reader 124 which provides the credit card receiving slot 14, and to switch units 125 and 126 controlled by the buy and refund buttons 15 and 17.

As shown, the isolation circuitry 120 is also connected to a unit 128 which controls operation of release devices of the delivery unit 52 to release an assembly of a completed card and associated envelope and bag to fall into the delivery receptacle 19. In addition, the isolation circuitry 120 may be connected to a people sensor 132 which senses the presence of anyone in proximity to the machine, and to video monitor switch 134 which controls the monitor 106 to operate either from RGB or other color signals applied through the cable 107.

The computer 136 controls operation of the robot 24 and the printer 50. The computer 136 is connected via a RS232 serial link 137 to the computer 110, through a RS232 serial link 138 to a controller 140. Controller 140 is connected through interface and drive control circuits 141 and 142 to sense and control movements of the robot 24, supply of vacuum to the vacuum cups 37 and 38 of the transfer head 38 and control other operations including the energization of drive motor 87 for the kick roller 70 (FIG. 7), the energization of the motor 100 of the decurl assembly (FIG. 9) and the operation of the delivery unit 52. The computer 136 is also connected through a parallel bus 143 to the printer 50 and through a RS232 serial link 144 to a controller 146 for the modification station 56.

The computer 136 is also connected through a RS232 serial link 149 to a modem 150. Likewise, the computer 136 is connected, via an expansion slot, to a facsimile board 153. The modem 150 and the facsimile board 153 are each connected to a telephone line 151 for transmission of data or monitoring of machine operation at a remote location 154, as well as servicing or control of the machine from the remote location. Use of the facsimile board enables the machine 10 to contact the remote location 154 either by (1) transmitting data directly to a facsimile machine or (2) transmitting data to any suitable receiver capable of receiving and utilizing facsimile telephone transmissions, such as another computer which is also equipped with a facsimile board.

The modem 150 enables the machine 10 to transmit data to a data unit at the remote location 154. The modem 150 also enables the machine 10 to receive data from the remote location 154.

Figure 9:
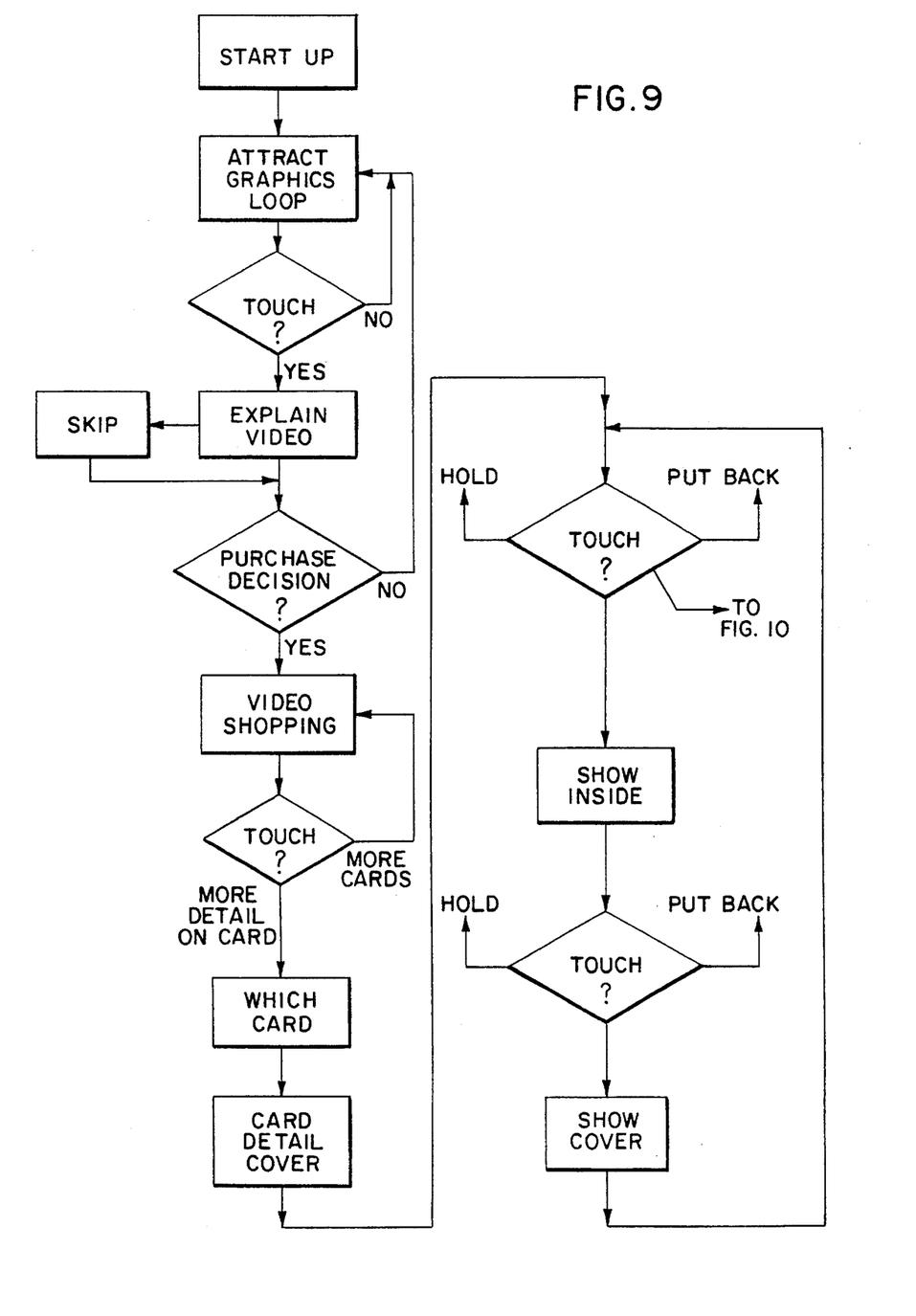
FIGS. 9–12 are flow diagrams illustrating the operation of the computer equipment shown in FIG. 8.
Figure 10:
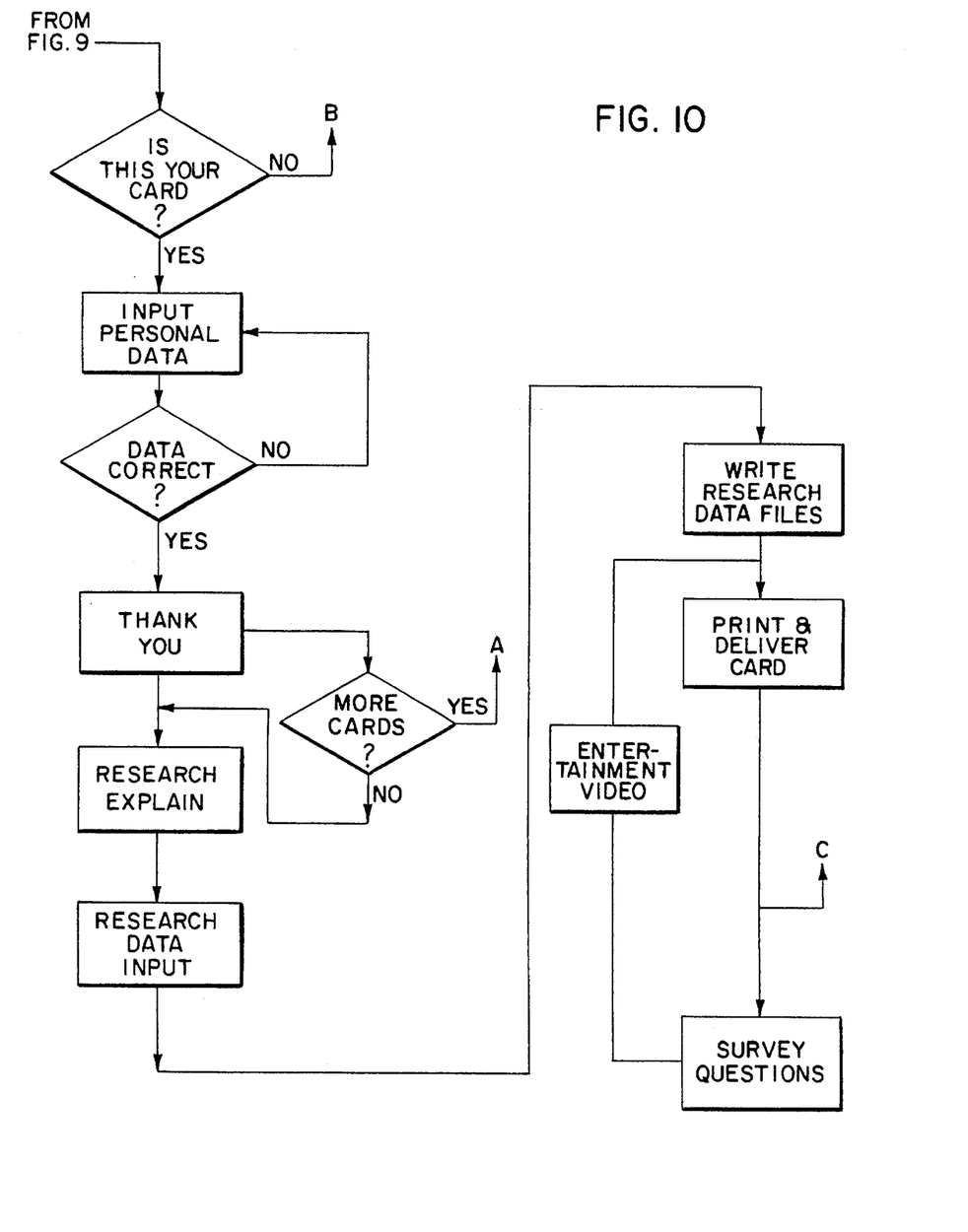

The logical flow charts of FIGS. 9 and 10 depict presentation operations of the computer 110. As shown, at start-up, graphics displays are generated to alert customers in the vicinity of the machine 10 as to products available from the machine and to instruct a customer as to how to learn about the products and the mode of operation of the machine. The displays include a message inviting the customer to touch the screen to obtain more information as to operation of the machine and more detailed information as to available products.

Upon touching the screen 11, the system advances to a decision block where an explanatory video is generated with associated sound. The customer is invited to make a revocable decision to consider purchase of a product, by touching a selected area of the screen 11. If the screen is not touched after a certain time interval, the operation reverts to the start condition. If the customer decides to consider a purchase, the system advances to an "explain video" block wherein a video shopping program is initiated in which, for example, the customer is invited to select from a number of categories.

For example, if the customer selects the birthday card category, he or she may then be invited to select between categories of cards. The customer's responses to interview questions enable reduction of available designs to an appropriate subset of designs of a given type. The available cards of a given type are singularly presented in a "one-up" mode in accordance with the display sequencing of the present invention to assure that best selling designs are readily accessible, as described below, until the customer finds a suitable design. Then more detail is provided, including full screen high resolution images of the cover and inside of the card. Once the customer finds a card to his or her liking, the buy button 15 (FIG. 1) is pressed and an operation is then initiated for selection of personalized data. This operation is similar to that disclosed in the aforementioned Banks et al. application U.S. Ser. No. 514,670, filed Apr. 25, 1990, the disclosure of which is incorporated by reference.

Should a customer not have time to input the necessary information to achieve a personalized product such as a personalized greeting card, the customer is instructed audibly through voice generating means and visually through the screen 11 that the customer may select a standard card design which requires no personalization prior to being printed. Further, the customer is instructed audibly through voice generating means and visually through the screen 11 that the customer may select a card designed for personalization and allow the machine to select personalizing indicia suitable to any customer. Either of these two nonpersonalized card selections results in a card of high quality being available to the customer without the expensive and space consuming selection racks typical to card shops.

After the customer indicates final approval of a card, operation is initiated to print the card, data stored in the RAM of the computer 110 and in the memory unit 116 being transferred to the background computer 136 through the serial link 137. The aforedescribed printing and associated assembly operations are then initiated under control by the computer 136. At this time, the customer is informed through video and audio presentations as to the expected time before the card will be completed and is invited to participate in supplying marketing and consumer information as his or her sex, age, etc. as well as similar information concerning the recipient of the card, and any comments which the customer may wish to convey.

As the customer answers the marketing and consumer information questions, the data is stored in memory for later use. Then, if time remains, an entertainment video may be presented until the card has been completed and delivered. Preferably, this entertainment video may be bypassed so that a consumer may immediately begin shopping again. Such a bypass is preferably effected by use of the video touch screen.

Figure 11:
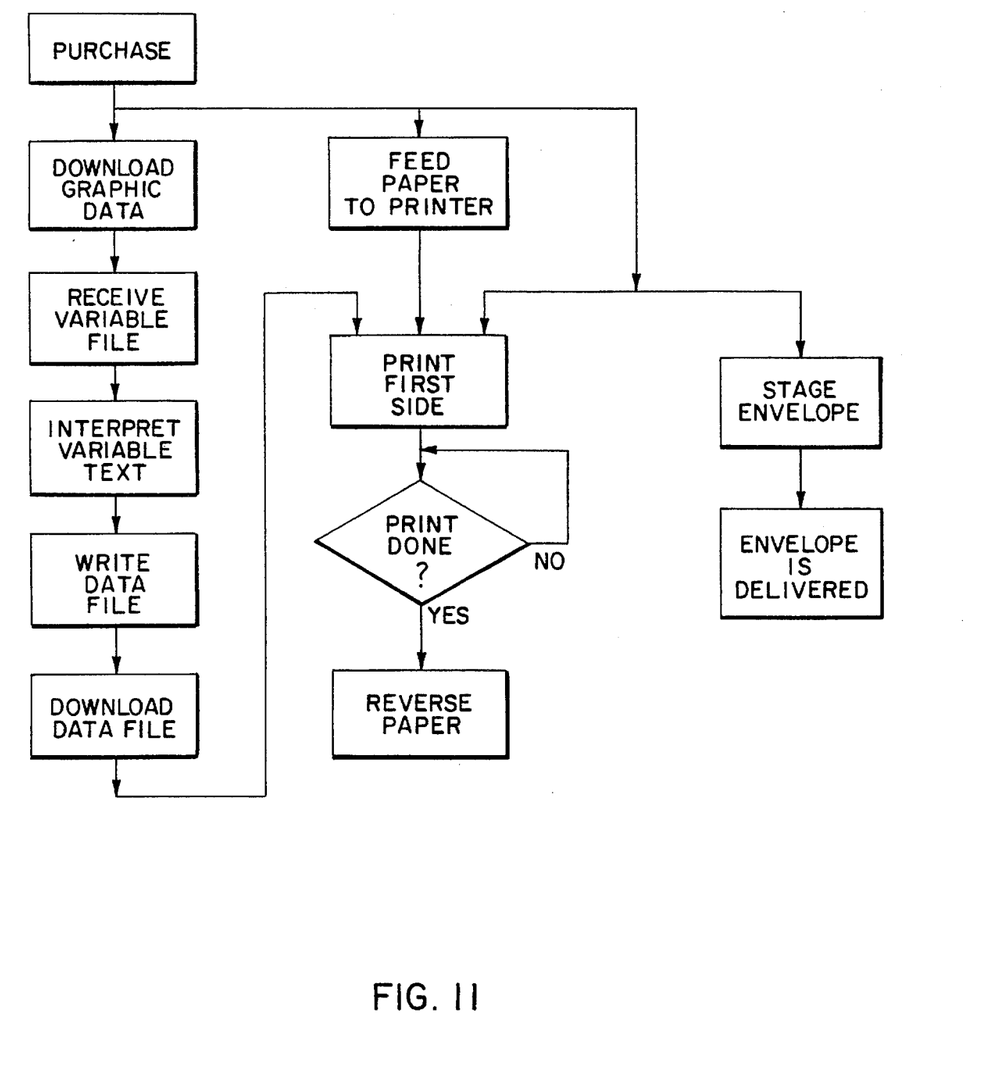
Figure 12:
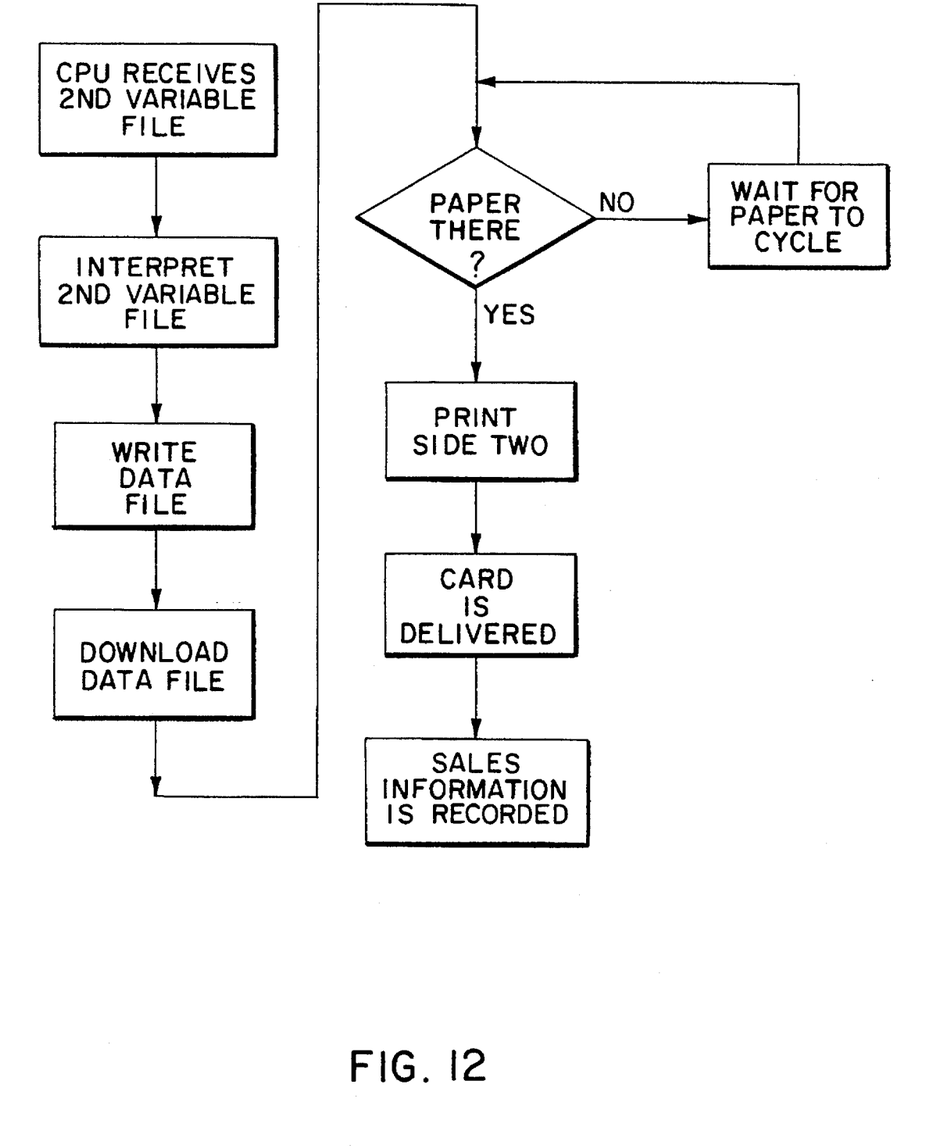

General operations of the computer 136 are illustrated in the flow diagrams of FIGS. 11 and 12. As shown in FIG. 11, once the consumer has decided to make a purchase, the computer 136 downloads the graphical data and causes base product such as greeting card stock to be loaded into the printer 50. Where a personalized product is selected by the consumer, the computer 136 then receives a variable file created by the personalization entered by the consumer, interprets that text, writes a first data file, and then downloads that data file to print the first side of a personalized product such as a greeting card.

When the customer selects a personalizable product but does not wish to enter personalizing data, a data file created to replace a variable file created by the personalization entered by the customer is accessed by the computer 136 which is then downloaded to print the first side of a nonpersonalized product such as a greeting card. When the customer selects a nonpersonalizable product, the data file associated with that product is accessed by the computer 136 and that file is then downloaded to print the first side of a nonpersonalized product such as a greeting card. Following transfer of either of the three data files described above, the envelope for the personalized product is staged for delivery to the customer.

Once the first side of the personalized product is printed, the computer 136 supplies control signals to reverse the base product, such as greeting card stock, such that the second side may be printed. As seen in FIG. 12, the computer 136 then receives the second variable file, interprets that file and writes a second data file. Where a nonpersonalized product is selected or a customer elects not to personalize a personalizable product, the appropriate related data file is accessed by the computer 136. The second data file, appropriate to the product selected, is then downloaded, the computer 136 determines whether the base product in the proper position, and the second side of the personalized product, such as a personalized greeting card, is printed and the card and envelope are delivered.

The computer equipment stores in memory various sales information concerning each transaction including the available designs viewed, the product sold, and the time of sale. The computer equipment also compiles at the buyer's option, the buyer's answers to the various marketing and consumer survey questions such as the age of the buyer, the age of the intended recipient, the number of similar products recently purchased by the buyer, and the income bracket of the buyer. Such information is recorded so that a periodic report of the information may be compiled and provided to the machine's owner of operator, as described in Ser. No. 864,418, filed Apr. 6, 1992.

Figure 13:
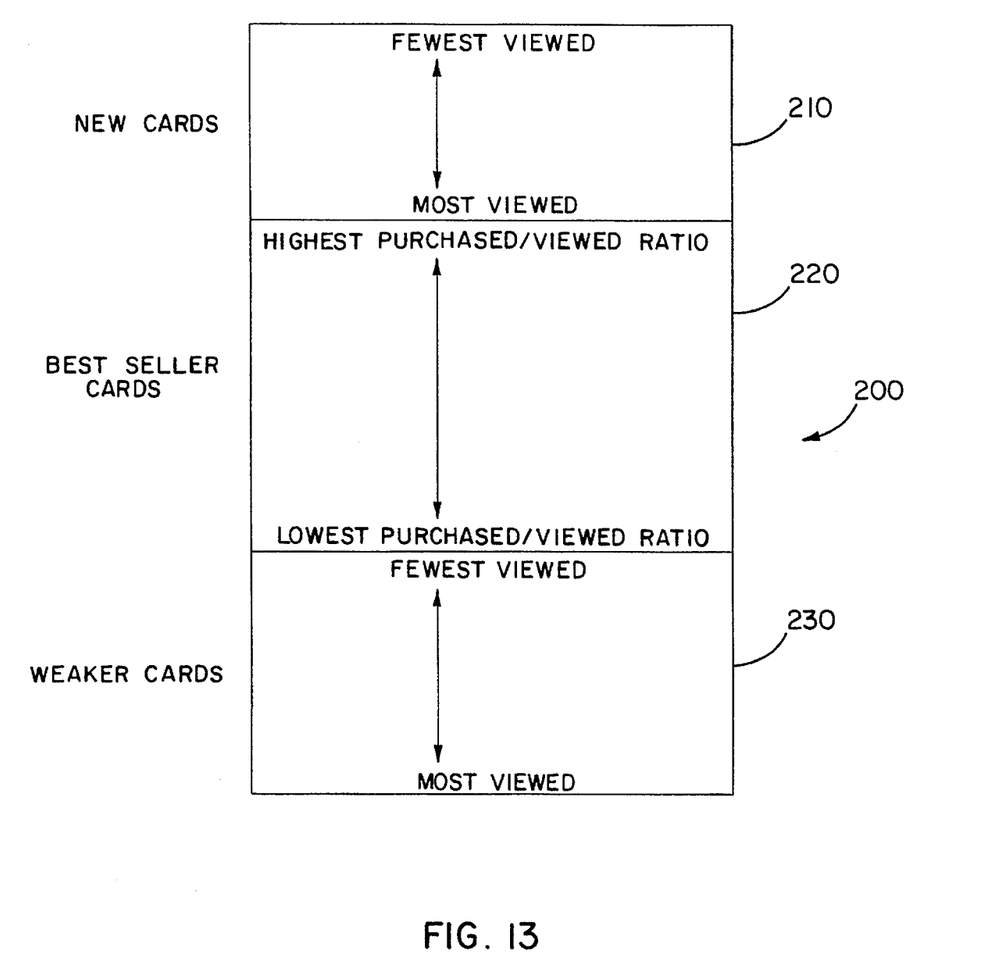
FIG. 13 is a diagrammetric representation of the hierarchy of a plurality of cards of a given type arranged in a list according to the present invention.

FIG. 13 illustrates the hierarchy of a plurality of cards of a given type ordered in accordance with the present invention. The computer equipment accesses information concerning the number of times a given design is viewed and the number of purchases of the design to generate a list or stack 200 of a group of social occasion greeting cards or other personalized products of a given type. The designs are thereafter sequentially displayed in accordance with their respective order in the list or stack 200. A first or New Cards category 210 of the stack 200 includes new greeting card designs. In this category, the greeting card designs are ordered with those viewed the least number of times arranged first or at the beginning of the list 200. On the other hand, those products in the New Cards category viewed the most number of times are placed last or at the end of the stack in the New Cards category 210 with card designs having intervening numbers of viewings located therebetween. Accordingly, newly available designs are given first priority to a customer selecting a design of a given type. As described below, when a design placed in the New Cards category has been viewed in excess of a selected number of times, that card is removed from the New Cards category 210 and placed in another appropriate category.

A second category 220 of the stack 200 includes the most successful or best selling social occasion greeting card designs, shown in FIG. 13 as the Best Seller Cards category. As noted below, the system periodically determines the most successful greeting card designs by determining the ratio of the number of times the greeting card is printed in comparison to the number of times that same greeting card is viewed. In this category, the greeting cards are ordered with those having the greatest sold versus viewed ratio arranged at the beginning or top of the list of the best selling category 220 and in descending order thereafter. Thus, the greeting cards with a lower sold versus viewed ratio are placed in the bottom of the Best Seller Cards category 220.

In the event that a greeting card design of a given type fails to exceed a threshold selling versus viewed ratio, such design is placed in a third "Weaker Cards" category 230. In this category, those cards viewed the fewest number of times are placed at the beginning or top of the stack and in ascending order thereafter. Accordingly, the "Weaker Card" category cards are ordered from the fewer times viewed to more times viewed. Thus, the designs in the Weaker Cards category are rotated to enable less often viewed designs to be placed at the beginning of the category. As described below, this product ranking system is periodically updated at each machine to facilitate customer selection. In the preferred embodiment, the data utilized to form this ranking list is updated daily based on transactions occurring during the interim.

Figure 14:
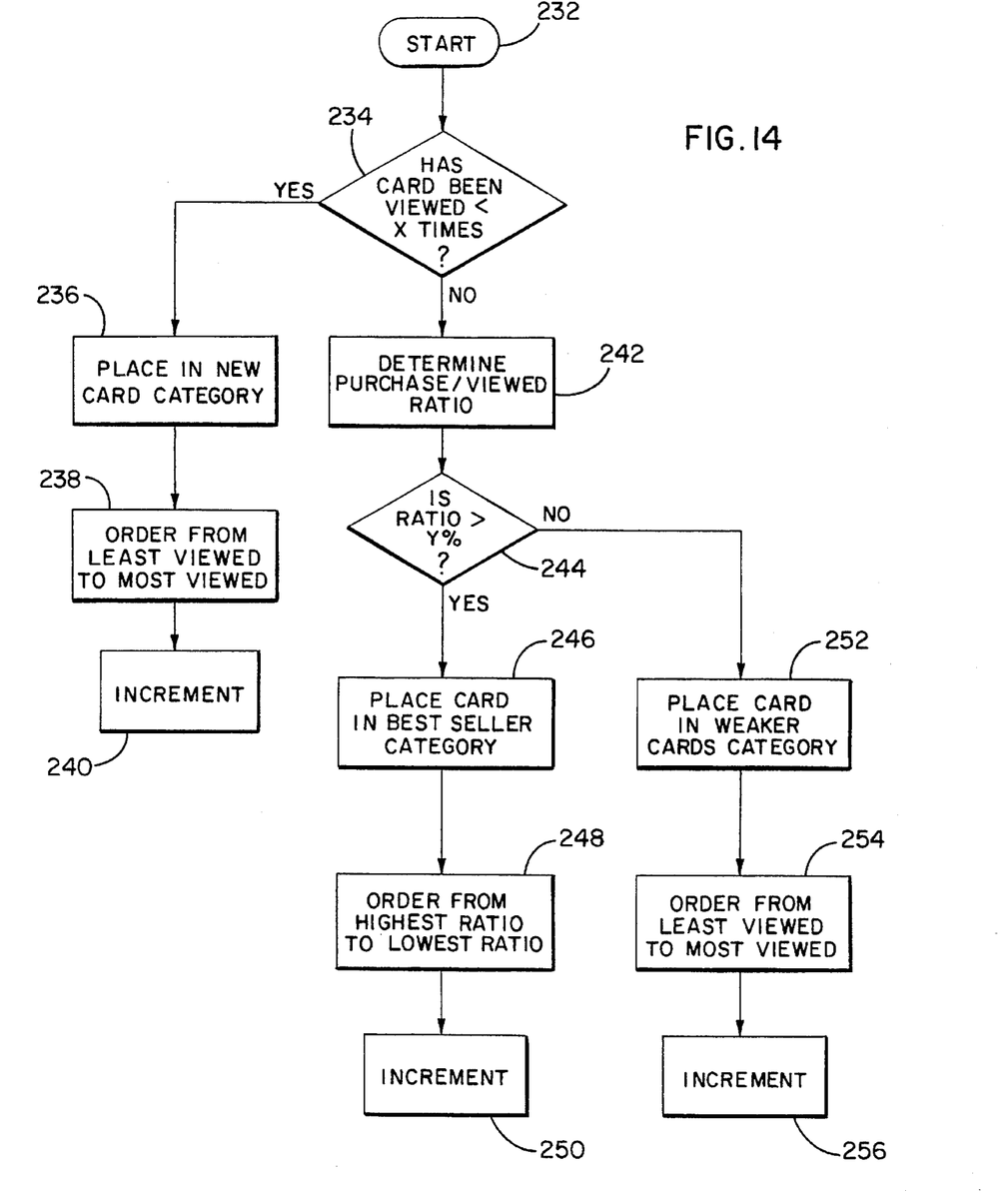
FIG. 14 is a logical flow diagram for operation of a dynamic ranking system according to the present invention.

FIG. 14 is a logical flowchart of operation of a ranking system according to the present invention. The system begins at a start block 232 and advances to a decision block 234. At decision block 234, the system determines whether a greeting card has been viewed less than a threshold number of times. In a preferred embodiment, this threshold is set at five viewings of a particular design. However, those skilled in the art will appreciate that any threshold value may be utilized based on use of the system. If yes, then the design is placed in the New Cards category at a block 236. The system thereafter places the greeting card design located in the New Cards category in an appropriate ordering location from those viewed least to those viewed the greatest number of times at a block 238. Next, the system increments at a block 240 to place the next design in an appropriate category and repeats. Of course, once a greeting card design in the New Cards category has been viewed more than the threshold value or, alternatively in excess of a selected number of days, such design is relocated to either the Best Sellers category or Weaker Cards category.

If, on the other hand, the system determines that a greeting card design has been viewed more times than the threshold value at decision block 234, the system advances to a next block 242. At block 242, the system determines a ratio of the number of times a greeting card design has been purchased in comparison to the number of times the design has been viewed. At decision block 244, the system then determines whether this ratio is greater than a threshold value. In the preferred embodiment, the threshold ratio is eight percent.

If, at decision block 244, the system determines that the threshold value is exceeded, the system advances to a block 246. At block 246, the system places the design in the Best Sellers category. The system then orders the design from the highest viewed ratio to the lowest viewed ratio at a block 248. The system then increments to the next card at a block 250 and branches back to the number of times viewed block 234 and repeats.

On the other hand, if the greeting card ratio fails to exceed the threshold value at decision block 244, the system places the design in a Weaker Card category at a block 252. In this instance, the system then advances to a block 254 where the design is ordered from least viewed to most viewed. The system the increments to the next card at a block 256 and branches to the number of times viewed decision block 234. In this way, each of the designs of a given type are dynamically ranked.

The system periodically repeats the steps described above for each design of a plurality of designs of a given type. Likewise, the system periodically repeats the steps for each type or subset of available greeting card designs. In the preferred embodiment only those designs which have been viewed during an actual purchase by a customer are ranked. Additionally, the ranking is preferably executed daily during the evening or other off-peak time interval.

As set forth above, an improved display sequencing system and method of using the same has been described. Various modifications as would be apparent to one of ordinary skill in the art and familiar with the teaching of this application are deemed to be within the scope of this invention. The precise scope of the invention is set forth in the appended claims, which are made, by reference, a part of this disclosure.

Various advantages flow readily from the disclosed display sequencing design and the corresponding method of displaying personalized social occasion products. For example, a dramatic decrease in the time for creating a personalized product is required in the same commercial setting. That is, where a previous system may display greeting cards of a given type in a random fashion, the present invention first displays those designs which are relatively new. Thereafter, the best selling greeting cards are displayed to eliminate significant time otherwise spent perusing through available designs. Next, the weaker selling greeting cards are displayed sequentially from the least viewed to the most viewed so that all greeting card designs have a fair opportunity to be selected. Additionally, the present invention enables customization at each machine location inasmuch as the display sequence at a given location is based on its own unique sales history. This arrangement provides a response to customer preferences and demographics.

Accordingly, both the structure and the method of displaying of the present invention provides significant improvements over the prior art, improvements that are manifested in both faster greeting card selection and enhanced marketing capability.

What is claimed is:

1. A method for sequentially displaying personalized social occasion products in response to a request to view available products of a given type in a machine comprising the steps of assigning a value to each of a plurality of personalized products of a given type related to prior sales of each of said plurality of personalized products;

ranking each of the plurality of personalized products in accordance with said value;

displaying each of the plurality of products in accordance with the ranking; and periodically updating the ranking of each of the personalized social occasion products of a given type.

2. The method of claim 1 wherein the value corresponds to the ratio of the number of purchases of the personalized product in comparison to the number of viewings of the personalized product.

\* \* \* \* \*